United States Patent
Shen et al.

(10) Patent No.: US 12,554,621 B2
(45) Date of Patent: Feb. 17, 2026

(54) SYSTEM AND METHOD TO DETECT PROBLEMATIC CODE CHANGES IN FIRMWARE

(71) Applicant: DELL PRODUCTS L.P., Round Rock, TX (US)

(72) Inventors: Xiaowei Shen, Shanghai (CN); Xiaoxuan Dong, Shanghai (CN); Tianyu Zheng, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 185 days.

(21) Appl. No.: 18/507,468

(22) Filed: Nov. 13, 2023

(65) Prior Publication Data
US 2025/0130922 A1    Apr. 24, 2025

(30) Foreign Application Priority Data
Oct. 23, 2023    (CN) .......................... 202311381635.6

(51) Int. Cl.
*G06F 9/44* (2018.01)
*G06F 11/362* (2025.01)
*G06F 11/3668* (2025.01)

(52) U.S. Cl.
CPC ...... *G06F 11/3636* (2013.01); *G06F 11/3688* (2013.01); *G06F 11/3692* (2013.01)

(58) Field of Classification Search
CPC ............. G06F 11/3636; G06F 11/3688; G06F 11/3692
See application file for complete search history.

(56) References Cited

U.S. PATENT DOCUMENTS

| | | | |
|---|---|---|---|
| 10,990,514 B2 | 4/2021 | Magnezi et al. | |
| 2006/0200482 A1* | 9/2006 | Tan | G06F 16/289 |
| 2019/0340103 A1* | 11/2019 | Nelson | G06F 11/3698 |
| 2020/0019493 A1* | 1/2020 | Ramakrishna | G06F 11/3684 |
| 2023/0136945 A1* | 5/2023 | Todd | G06F 8/65 |
| | | | 714/38.1 |
| 2023/0297491 A1* | 9/2023 | Sariel | G06F 8/41 |
| | | | 717/124 |

* cited by examiner

*Primary Examiner* — Qamrun Nahar
(74) *Attorney, Agent, or Firm* — Larson Newman, LLP (57) ABSTRACT

An information handling system includes a storage and a baseboard management controller. The storage stores a current firmware release for the information handling system. The baseboard management controller generates a set of breakpoints for code differences from a previous firmware release to the current firmware release and executes multiple testcases for the current firmware release. Based on the execution of the testcases, the baseboard management controller stores breakpoint hitting events for the testcases in the storage. The baseboard management controller filters and ranks the breakpoint hitting events and maps the filtered and ranked breakpoint hitting events to the code differences. The baseboard management controller stores a reduced list of the code differences that are highly related to failed testcases of the current firmware release in the storage.

20 Claims, 8 Drawing Sheets

SYSTEM AND METHOD TO DETECT PROBLEMATIC CODE CHANGES IN FIRMWARE

FIELD OF THE DISCLOSURE

The present disclosure generally relates to information handling systems, and more particularly relates to detecting problematic code in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a storage and a baseboard management controller. The storage may store a current firmware release for the information handling system. The baseboard management controller may generate a set of breakpoints for code differences from a previous firmware release to the current firmware release and execute a plurality of testcases for the current firmware release. Based on the execution of the testcases, the baseboard management controller may store breakpoint hitting events for the testcases in the storage. The baseboard management controller may filter and rank the breakpoint hitting events and map the filtered and ranked breakpoint hitting events to the code differences. The baseboard management controller may store a reduced list of the code differences that are highly related to failed testcases of the current firmware release in the storage.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
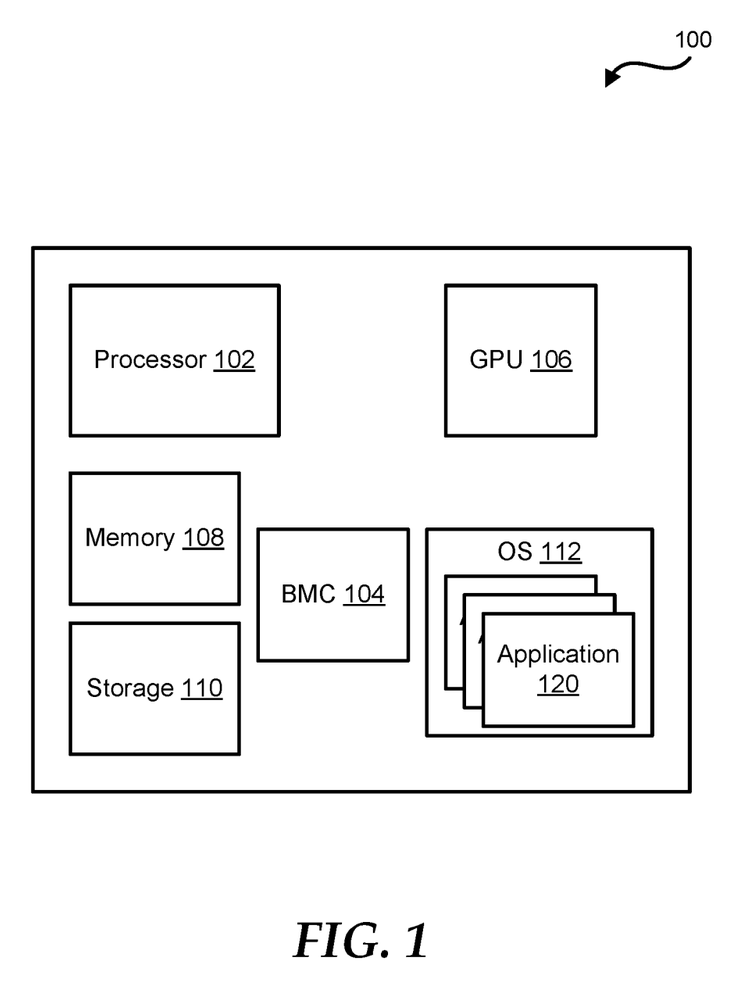
FIG. 1 is a block diagram of a portion of an information handling system according to at least one embodiment of the present disclosure.

FIG. 1 illustrates a portion of an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a processor 102, a baseboard management controller (BMC) 104, a graphics processing unit (GPU) 106, a memory 108, a storage 110, and an operating system (OS) 112. In an example, OS 112 may include one or more applications or firmware 120 that may be executed by processor 102, BMC 104, or GPU 106. While executing application 120, processor 102, BMC 104, or GPU 106 may access memory 108. Additionally, processor 102, BMC 104, or GPU 106 may write/read data from storage 110. In an example, applications or firmware releases 120 may be written in storage 110. Information handling system 100 may include additional components without varying from the scope of this disclosure.

In an example, BMC 104 may provide a multi-thread architecture for information handling system 100. For example, BMC 104 may execute or run multiple background threads to monitor sensors and scheduled tasks within information handling system 100. During the execution of a large number of background threads, some breakpoints in the instructions may occur or hit regardless of how a testcase is performed during the device-under-test (DUT). In an example, these breakpoints may be hit in all testcases.

Information handling system 100 and execution of applications, such as background applications 120, by BMC 104 may be improved by determining significant breakpoints for a failed testcase during DUT. In certain examples, the significant breakpoints may cause one or multiple testcases to fail while other testcases may pass without an impact. During the development phase of next release of the software, the development phase may accumulate a large amount of code differences. As used herein, code differences refer to changes in the code from a previous version to the current version. In certain examples, the development phase of a software release may take serval days or weeks.

In previous information handling systems, when a testcase failure is determined, by using the newly released software, individuals always had to manually confirm that the failure was an issue and open a bug. During a debug process in the previous information handling systems, an analysis, debug, and reproduction of the issue may be performed to find a root cause and identify which code change introduced the issue. In the previous information handling systems, a root cause analysis tool may help find failed testcases caused by a software release change. The root cause analysis tool would not determine which code change introduced the issue. In the previous information handling systems, a breakpoint mechanism in a debug tool may probe runtime behavior (thread, call stack, break position) of the DUT software without rebuilding the DUT software.

In certain examples, information handling system 100 may be improved via a fully automated operation to narrow down problematic code changes in firmware black box testing. In an example, this determination of the problematic code changes may be performed by BMC 104 mapping breakpoints to code changes as a probe to sample runtime information of a DUT. During the operation of testcases, BMC 104 may perform one or more suitable operations to evaluate an impact of a breakpoint and determine a potential code change that is associated with the issue. Operations performed by BMC 104 will be described with respect to FIGS. 2-4 below.

Figure 2:
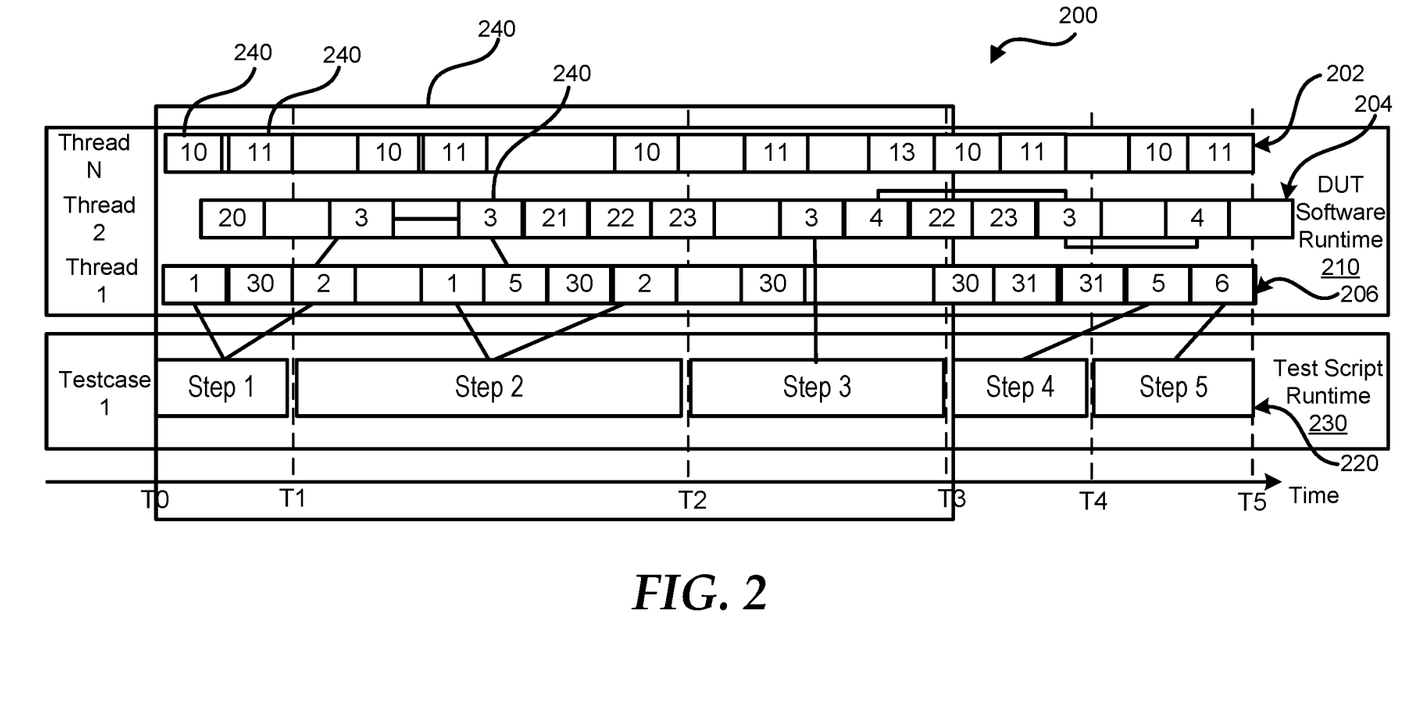
FIG. 2 is a diagram of breakpoints for multiple threads executed during a testcase according to at least one embodiment of the present disclosure.

FIG. 2 illustrates multiple threads 202, 204, and 206 executed during a DUT software runtime 210 according to at least one embodiment of the present disclosure. In an example, threads 202, 204, and 206 may be associated with a testcase 220 executed within a test script runtime 230. Threads 202, 204, and 206 may include multiple basic code blocks with breakpoints 240. Testcase 220 may include steps 1, 2, 3, 4, and 5. In certain examples, BMC 104 may determine a suspicious range 250 of blocks of code as will be described below.

In an example, BMC 104 may split the code difference into basic code blocks 240 and insert breakpoints into the code blocks. In certain examples, breakpoint hitting may occur based on four different factors: breakpoint position; hit time; thread identifier; and function call stack. Different code blocks 240 of threads 202, 204, and 206 may be associated with different steps 1, 2, 3, 4, and 5 of testcase 220. In certain examples, each step of testcase 220 may be executed for different periods of time of test script runtime 230. For example, step 1 may be executed during the time period from T0 to T1, step 2 may be executed during the time period from T1 to T2, step 3 may be executed during the time period from T2 to T3, step 4 may be executed during the time period from T3 to T4, and step 5 may be executed during the time period from T4 to T5.

In certain examples, the execution of DUT software runtime 210 and test script runtime 230 may be asynchronized, such that a reaction in the DUT software runtime may not align to test steps of the test script runtime. For example, step 1 of testcase 220 may be associated with different code blocks/breakpoints 240 even if the code blocks are not executed before the end of step 1, such as time T1. In an example, step 1 may be associated with breakpoints IDs 1, 2, and 5 of thread 206 and breakpoint IDs 3 and 3 in thread 204. In this example, hits of these breakpoint may result from operations in test step 1. Similarly, hits to breakpoint IDs 1 and 2 of thread 206 may result from operations in test step 2. Hits to breakpoint IDs 3, 4, 3, and 4 of thread 204 may result from operations in test step 3. A hit to breakpoint ID 5 of thread 206 may result from operations in test step 4, and a hit to breakpoint ID 6 of thread 206 may result from operations in test step 5. In certain examples, hits to breakpoint IDs that are not connected to one of the steps of testcase 220, as illustrated by a line in FIG. 2, may be caused by factors other than operations in the testcase.

In an example, BMC 104 may detect a failure of step 3 in testcase 220. Based on the failure of step 3, BMC 104 may determine suspicious range 250 of code blocks and breakpoints 240 within threads 202, 204, and 206. As illustrated in FIG. 2, suspicious range 250 may extend from time T0 to T3 In certain examples, one or more code blocks/breakpoints 240 within suspicious range 250 may cause the failure of step 3. BMC 104 may filter breakpoints 240 to only include the breakpoints with hit times that are earlier than time T3, such that the breakpoints are within suspicious range 250. In an example, BMC 104 may utilize Term Frequency-Inverse Document Frequency (TF-IDF) to evaluate an impact of each breakpoint and determine a potential code change in thread 202, 204, and 206 that introduced the new issue as will be described with respect to FIG. 3.

Figure 3:
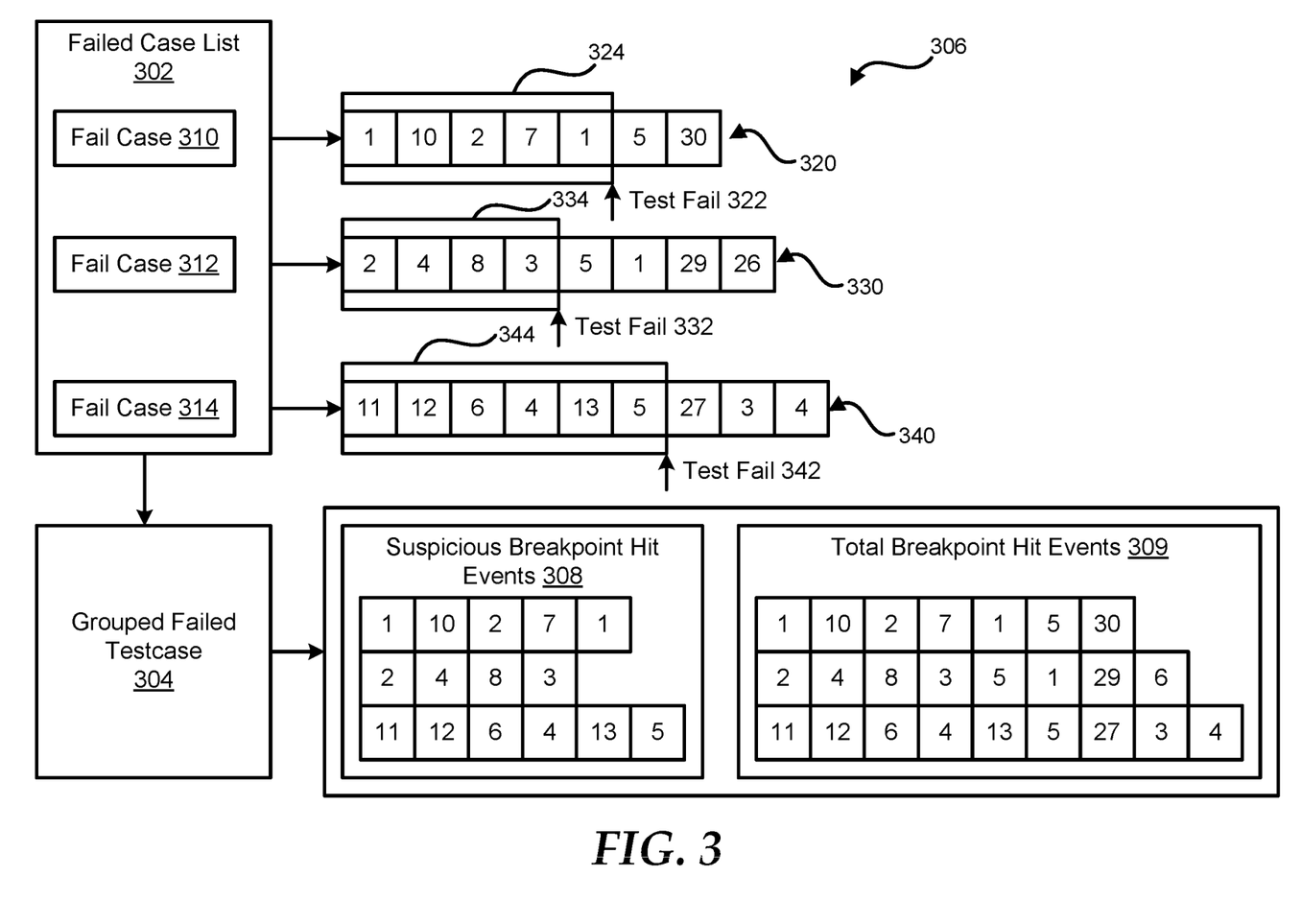
FIG. 3 is a diagram of grouped failed testcase breakpoint hit events according to at least one embodiment of the present disclosure.

FIG. 3 illustrates a failed case list 302, a grouped failed testcase 304, total breakpoint hit events 306, a group of suspicious breakpoint hit events 308, and a group of total breakpoint hit events 309 according to at least one embodiment of the present disclosure. Failed case list 302 includes multiple failed testcases 310, 312, and 314 and each failed testcase may be associated with a different set of thread for a DUT software runtime, such as DUT software runtime 210 of FIG. 2. In certain examples, failed case list 302 may include any suitable number of failed cases without varying from the scope of this disclosure.

In an example, BMC 104 may determine a set of breakpoint hit events 306 associated with a different one of failed testcase 310, 312, and 314. For example, failed case 310 may include a sequence of breakpoints 320. In certain examples, the breakpoints within sequence of breakpoints 320 may be arranged in the order that the breakpoints hit within a thread corresponding to failed testcase 310. BMC 104 may determine the breakpoint hits that occur prior to a test failure 322. In response to the determination of a location of test failure 322, BMC 104 may determine suspicious breakpoint hits 324 that occur before the test failure 322. BMC 104 may provide the breakpoint hits associated with failed testcase 310 to grouped failed testcase and separate or filter suspicious breakpoint hit events 308 from total breakpoint hit events 309.

In certain examples, the breakpoints within sequence of breakpoints 330 may be arranged in the order that the breakpoints hit within a thread corresponding to failed testcase 312. BMC 104 may determine the breakpoint hits that occur prior to a test failure 332. In response to the determination of a location of test failure 332, BMC 104 may determine suspicious breakpoint hits 334 that occur before the test failure 332. BMC 104 may provide the breakpoint hits associated with failed testcase 312 to grouped failed testcase 304 and separate or filter suspicious breakpoint hit events 308 from total breakpoint hit events 309.

In an example, the breakpoints within sequence of breakpoints 341 may be arranged in the order that the breakpoints hit within a thread corresponding to failed testcase 314. BMC 104 may determine the breakpoint hits that occur prior to a test failure 342. In response to the determination of a location of test failure 342, BMC 104 may determine suspicious breakpoint hits 344 that occur before the test failure 342. BMC 104 may provide the breakpoint hits associated with failed testcase 314 to grouped failed testcase 304 and separate or filter suspicious breakpoint hit events 308 from total breakpoint hit events 309.

Figure 4:
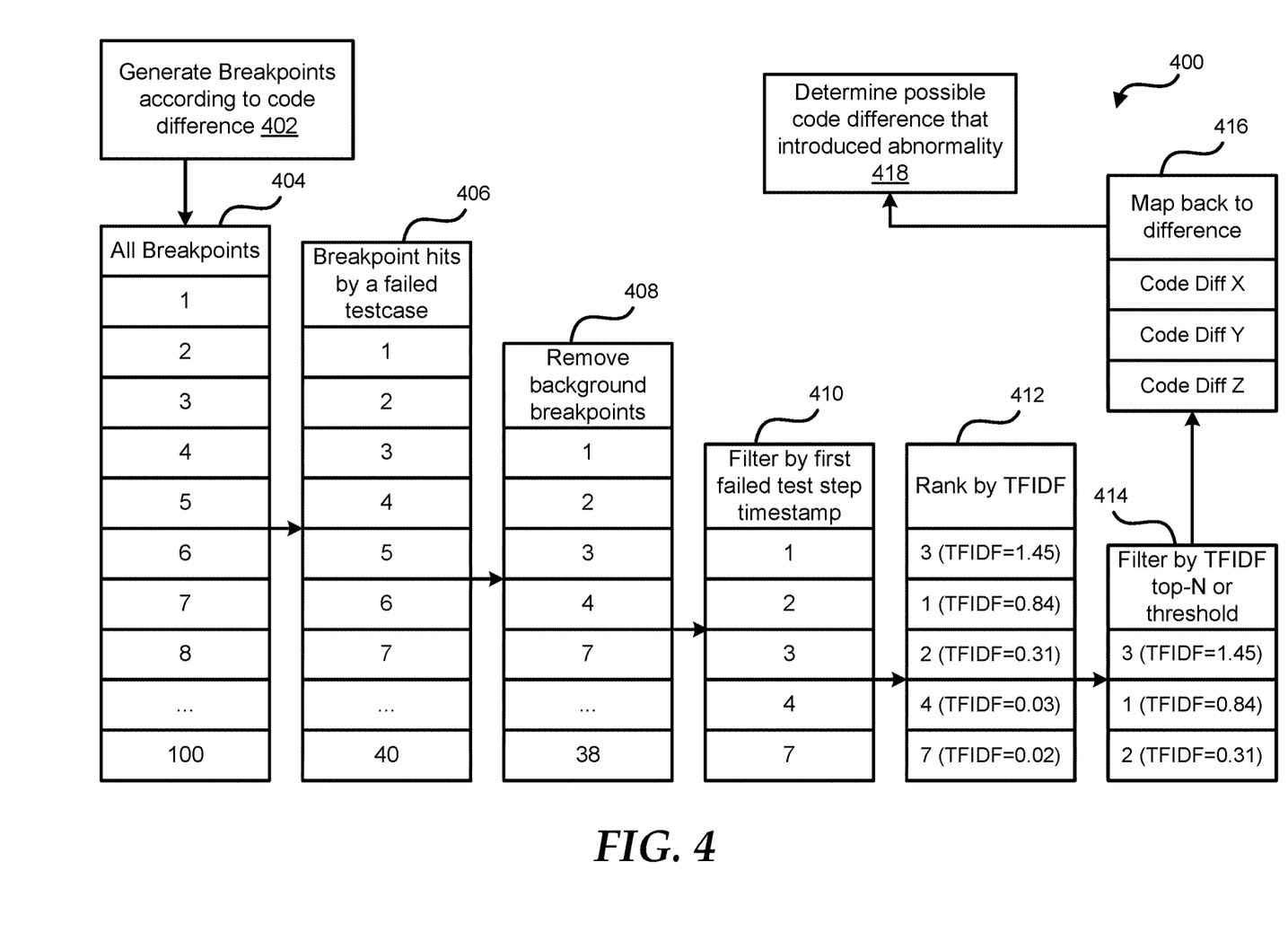
FIG. 4 is a diagram of a system and method for narrowing down bad code according to at least one embodiment of the present disclosure.

FIG. 4 illustrates a sequence of steps 400 for narrowing down bad code according to at least one embodiment of the present disclosure. In certain examples, the operations of the sequence of steps 400 may be performed by BMC 104 of FIG. 1. At step 402, BMC 104 may generate or determine breakpoint hits with an application. In an example, the breakpoint hits may be those based on code differences between a previous version and the current version of an application. At step 404, BMC 104 may list or compile all of the breakpoint hits within the application.

At step 406, BMC 104 may determine the breakpoint hits that are associated with a failed testcase and remove all other breakpoint hits from the list of breakpoint hits. At step 408, BMC 104 may remove breakpoint hits associated with background operations from the list of breakpoint hits. At block 410, BMC 104 may filter the list of breakpoint hits based on the time stamp of the failed testcase. In an example, BMC 104 may determine an ending time stamp for the failed testcase and remove or filter out all breakpoint hits that occur after the ending time stamp of the failed testcase.

At step 412, BMC 104 may score and rank all the breakpoint hits to find the most significant breakpoint position that caused test case failure. In an example, BMC 104 may rank the breakpoint hits based on a score generated via a TF-IDF to determine an impact or relevance of the particular breakpoint on the application code. For example, breakpoint hit three may have a TF-IDF score of 1.145, breakpoint hit one may have a TF-IDF of 0.84, breakpoint hit two may have a TF-IDF of 0.31, breakpoint hit four may have a TF-IDF of 0.03, and breakpoint hit seven may have a TF-IDF of 0.02. In this example, breakpoint three may have the greatest impact, followed by breakpoint one, then breakpoints two, four, and seven. At step 414, BMC 104 may filter the ranked breakpoint hits to determine the most significant breakpoint hits that caused test case failure. For example, the breakpoints may be filtered by a top number of TF-IDF scores, a threshold TF-IDF score, or the like.

At step 416, BMC 104 may map the top ranked breakpoint hits to the code difference in the application. For example, breakpoint three may be mapped to a code difference X, breakpoint one may be mapped to a code difference Y, and breakpoint two may be mapped to code difference Z. At step 418, BMC 104 may utilize the code differences to determine possibly code differences that may have introduced abnormalities in the application. In certain examples, the operations performed by BMC 104 to minimize the number of breakpoints in a suspicious range of testcase does not need to be rebuilt for releases with partial code committed and does not need to re-run the regression test cases against each rebuild release.

Figure 5:
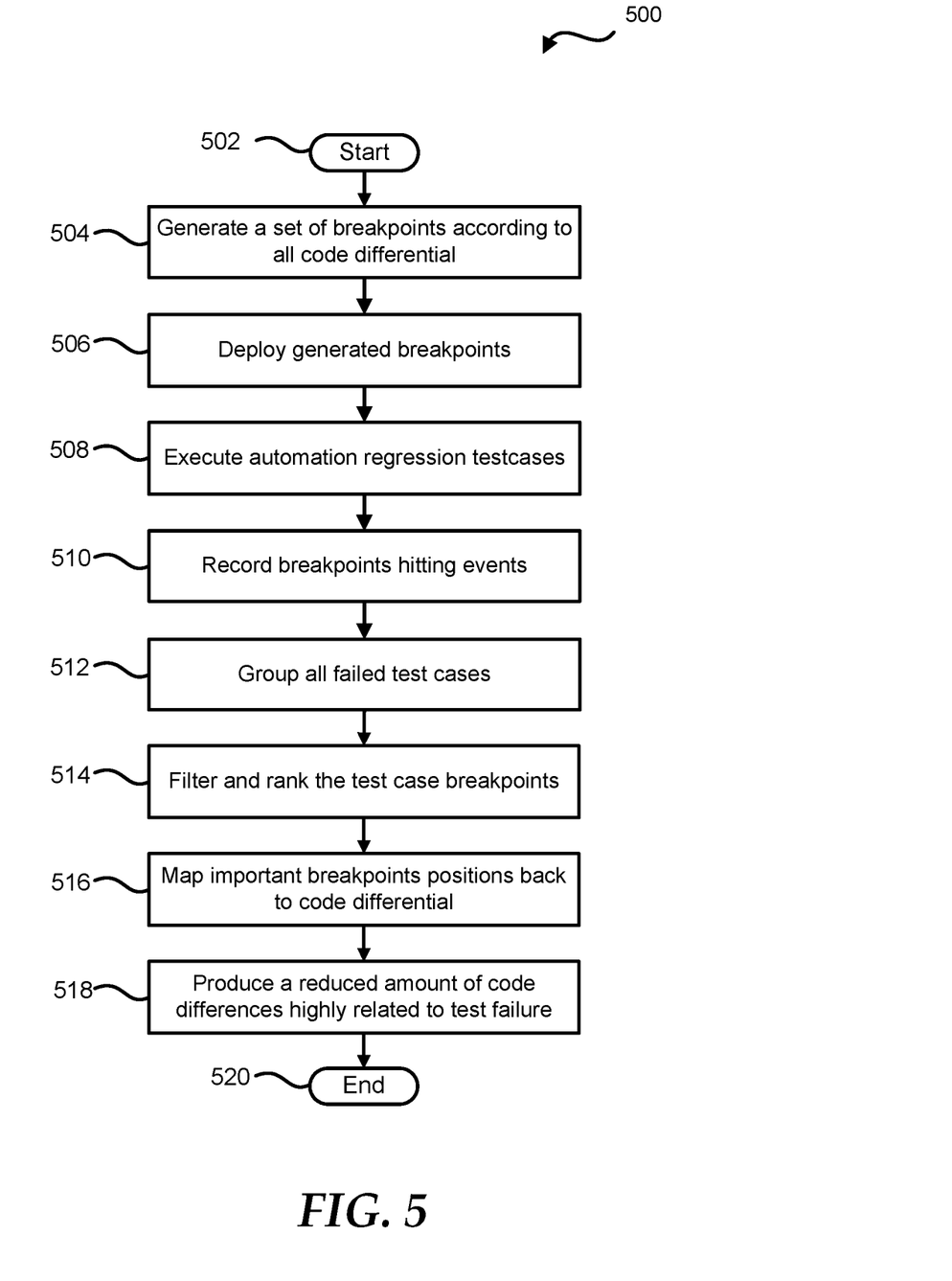
FIG. 5 is a flow diagram of a method for determining a group of code differences related to a testcase failure according to at least one embodiment of the present disclosure.

FIG. 5 is a flow diagram of a method 500 for determining a group of code differences related to a testcase failure according to at least one embodiment of the present disclosure, starting at block 502. In an example, method 500 may be performed by any suitable component including, but not limited to, BMC 104 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 504, a set of breakpoints are generated according to all code differences in an application. In an example, the code differences may be between two DUT firmware releases. At block 506, the generated breakpoints are deployed in testcases of the current firmware release. At block 508, an automation regression of the testcases are executed. In an example, the automation regression of the testcases may be performed as a probe to sample DUT firmware runtime context without interrupting the running of the information handling system. In certain examples, the testcases may be executed without modify source code to add debug information and build debug image.

At block 510, breakpoint hitting events are recorded. In an example, the breakpoint hitting events may be for all of the testcases including both failed testcases and passed testcases. At block 512, all failed testcases and the associated breakpoint hit events are grouped.

At block 514, the testcase breakpoint hits are filtered and ranked. In an example, the breakpoint hits are filtered to only include breakpoints for failed testcases. These filtered breakpoint hits are ranked based on the significance of the breakpoint hit with respect to the failed testcase. At block 516, the important or significant breakpoint hits are mapped to the code differences. At block 518, a reduced amount of code differences that are highly related to the testcase failure is produced or provided, and the flow ends at block 520.

Figure 6:
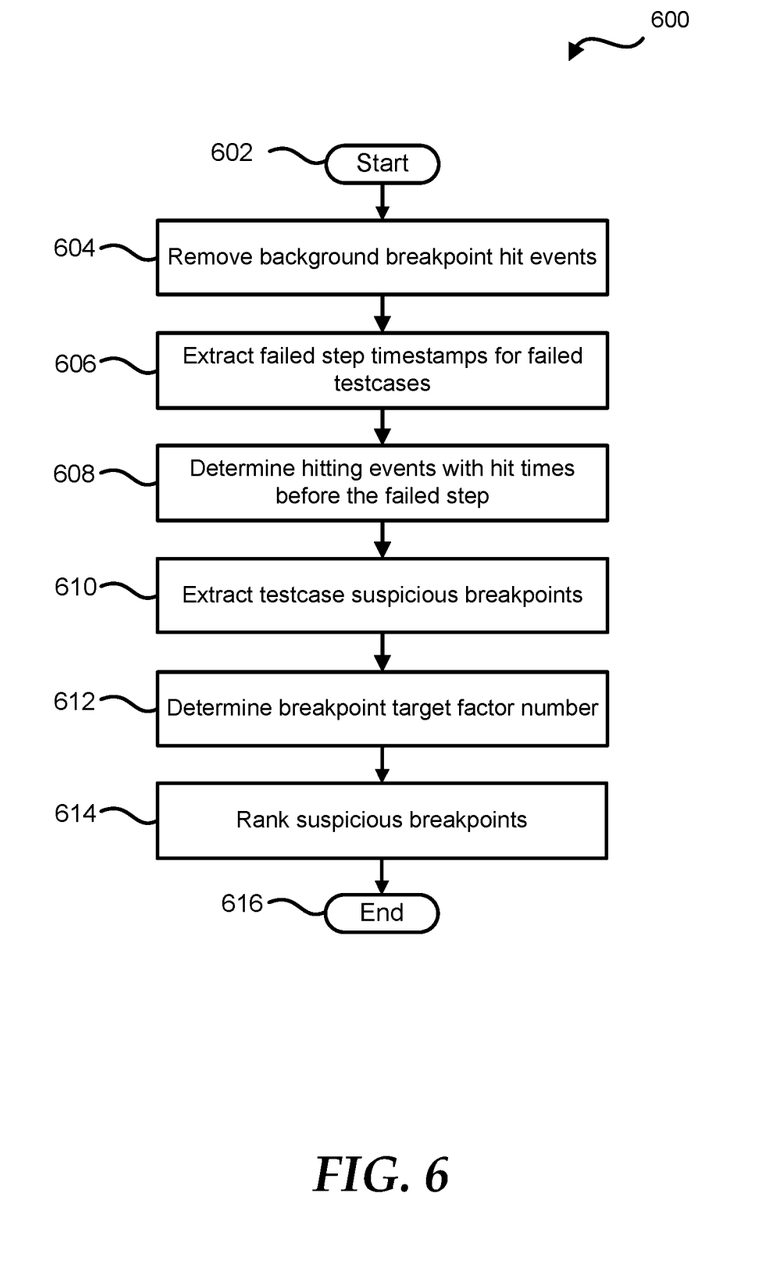
FIG. 6 is a flow diagram of a method for determining a group of code differences related to a testcase failure according to at least one embodiment of the present disclosure.

FIG. 6 is a flow diagram of a method 600 for determining a group of code differences related to a testcase failure according to at least one embodiment of the present disclosure, starting at block 602. In an example, method 600 may be performed by any suitable component including, but not limited to, BMC 104 of FIG. 1. In certain examples, method 600 may be substantially similar to operations performed in block 514 of FIG. 5. It will be readily appreciated that not every method step set forth in this flow diagram is always necessary, and that certain steps of the methods may be combined, performed simultaneously, in a different order, or perhaps omitted, without varying from the scope of the disclosure.

At block 604, breakpoint hit events associated with background operations are removed from the grouped failed testcase breakpoints. At block 606, the timestamps for the failed testcases are extracted. In an example, the timestamps may be the ending timestamp for each of the failed testcases. At block 608, breakpoint hitting events with hit times before the ending timestamps of the failed testcases.

At block 610, testcase suspicious breakpoints are extracted from all breakpoint hit events. At block 612, a different breakpoint target factor number is determined for each extracted breakpoint. At block 614, the suspicious breakpoints are ranked, and the flow ends at block 616. In an example, the breakpoint hits may be ranked based on a score generated via a TF-IDF to determine an impact or relevance of the particular breakpoint on the application code.

Figure 7:
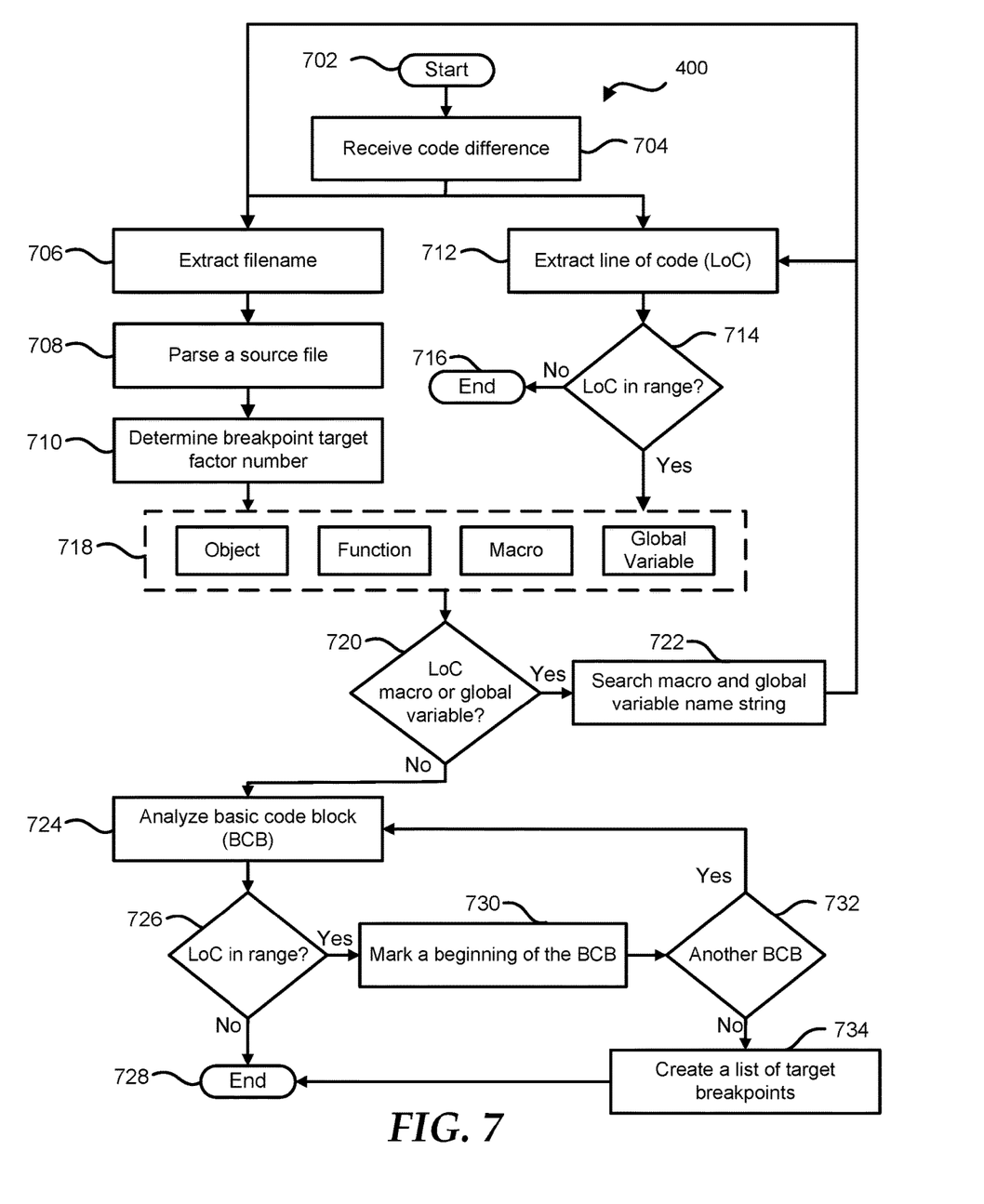
FIG. 7 is a flow diagram of a method for ranking testcase breakpoints according to at least one embodiment of the present disclosure.

FIG. 7 is a flow diagram of a method 700 for ranking testcase breakpoints according to at least one embodiment of the present disclosure, starting at block 702. In an example, method 700 may be performed by any suitable component including, but not limited to, BMC 104 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 704, code differences are received. In an example, the code differences may be determined between a previous version of an application or firmware of a DUT and a current version of the application or firmware. After the code differences are received, the flow may continue at both block 706 and block 712. At block 706, a filename associated with the application or firmware is extracted from the code. At block 708, a source file is parsed. At block 710, a breakpoint target factor number is determined.

At block 712, a line of code (LoC) is extract for a breakpoint. At block 714, a determination is made whether the LoC is in a specific range. In an example, the range may be before an ending timestamp of a suspicious block of testcases. If the LoC is not within the specific range, the flow ends at block 716. If the LoC is within the specific range, the flow continues at block 718 and breakpoint positions are optimized based on different factors. For example, the optimization may be performed based on any combination of an object, a function, a macro, a global variable, or the like.

At block 720, a determination is made whether the LoC is a macro or global variable. If the LoC is a macro or global variable, the macro and global variable name string is searched at block 722 and the flow continues as described above with respect to blocks 706 and 712. If the LoC is not a macro or global variable, a basic code block (BCB) for the LoC is analyzed at block 724.

At block 726, a determination is made whether the LoC is in range. If LoC is not in range, the flow ends at block 728. If the LoC is in range, the beginning of the BCB is marked at block 730. At block 732, a determination is made whether another BCB is located within the LoC. If another BCB is within the LoC, the flow continues as described above with respect to block 724. If another BCB is not within the LoC, a list of target breakpoints is created at block 734 and the flow ends at block 728.

Figure 8:
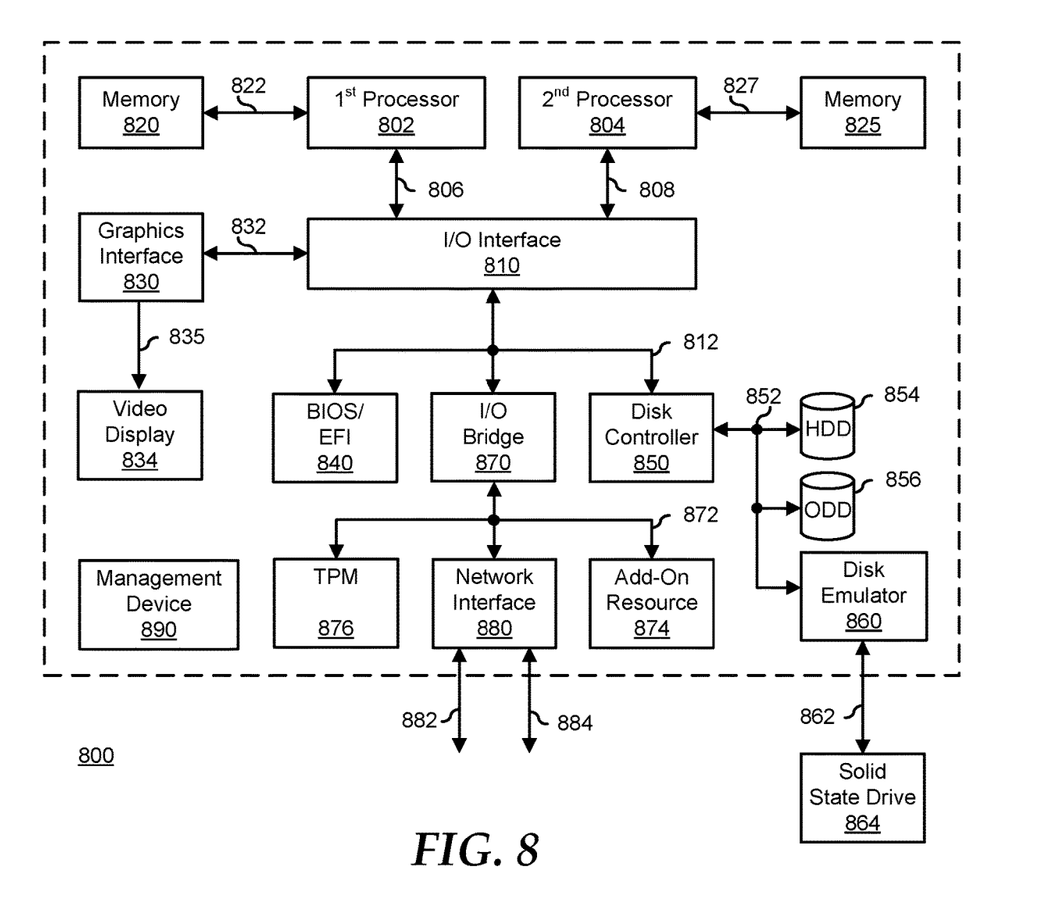
FIG. 8 is a block diagram of a general information handling system according to an embodiment of the present disclosure.

FIG. 8 shows a generalized embodiment of an information handling system 800 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 800 can include processing resources for executing machine-executable code, such as a central processing unit (CPU), a programmable logic array (PLA), an embedded device such as a System-on-a-Chip (SoC), or other control logic hardware. Information handling system 800 can also include one or more computer-readable medium for storing machine-executable code, such as software or data. Additional components of information handling system 800 can include one or more storage devices that can store machine-executable code, one or more communications ports for communicating with external devices, and various input and output (I/O) devices, such as a keyboard, a mouse, and a video display. Information handling system 800 can also include one or more buses operable to transmit information between the various hardware components.

Information handling system 800 can include devices or modules that embody one or more of the devices or modules described below and operates to perform one or more of the methods described below. Information handling system 800 includes a processors 802 and 804, an input/output (I/O) interface 810, memories 820 and 825, a graphics interface 830, a basic input and output system/universal extensible firmware interface (BIOS/UEFI) module 840, a disk controller 850, a hard disk drive (HDD) 854, an optical disk drive (ODD) 856, a disk emulator 860 connected to an external solid state drive (SSD) 862, an I/O bridge 870, one or more add-on resources 874, a trusted platform module (TPM) 876, a network interface 880, a management device 890, and a power supply 895. Processors 802 and 804, I/O interface 810, memory 820, graphics interface 830, BIOS/UEFI module 840, disk controller 850, HDD 854, ODD 856, disk emulator 860, SSD 862, I/O bridge 870, add-on resources 874, TPM 876, and network interface 880 operate together to provide a host environment of information handling system 800 that operates to provide the data processing functionality of the information handling system. The host environment operates to execute machine-executable code, including platform BIOS/UEFI code, device firmware, operating system code, applications, programs, and the like, to perform the data processing tasks associated with information handling system 800.

In the host environment, processor 802 is connected to I/O interface 810 via processor interface 806, and processor 804 is connected to the I/O interface via processor interface 808. Memory 820 is connected to processor 802 via a memory interface 822. Memory 825 is connected to processor 804 via a memory interface 827. Graphics interface 830 is connected to I/O interface 810 via a graphics interface 832 and provides a video display output 836 to a video display 834. In a particular embodiment, information handling system 800 includes separate memories that are dedicated to each of processors 802 and 804 via separate memory interfaces. An example of memories 820 and 830 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 840, disk controller 850, and I/O bridge 870 are connected to I/O interface 810 via an I/O channel 812. An example of I/O channel 812 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 810 can also include one or more other I/O interfaces, including an Industry Standard Architecture (ISA) interface, a Small Computer Serial Interface (SCSI) interface, an Inter-Integrated Circuit (I'C) interface, a System Packet Interface (SPI), a Universal Serial Bus (USB), another interface, or a combination thereof. BIOS/UEFI module 840 includes BIOS/UEFI code operable to detect resources within information handling system 800, to provide drivers for the resources, initialize the resources, and access the resources. BIOS/UEFI module 840 includes code that operates to detect resources within information handling system 800, to provide drivers for the resources, to initialize the resources, and to access the resources.

Disk controller 850 includes a disk interface 852 that connects the disk controller to HDD 854, to ODD 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits SSD 864 to be connected to information handling system 800 via an external interface 862. An example of external interface 862 includes a USB interface, an IEEE 4394 (Firewire) interface, a proprietary interface, or a combination thereof. Alternatively, solid-state drive 864 can be disposed within information handling system 800.

I/O bridge 870 includes a peripheral interface 872 that connects the I/O bridge to add-on resource 874, to TPM 876, and to network interface 880. Peripheral interface 872 can be the same type of interface as I/O channel 812 or can be a different type of interface. As such, I/O bridge 870 extends the capacity of I/O channel 812 when peripheral interface 872 and the I/O channel are of the same type, and the I/O bridge translates information from a format suitable to the I/O channel to a format suitable to the peripheral channel 872 when they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 800, a device that is external to the information handling system, or a combination thereof.

Network interface 880 represents a NIC disposed within information handling system 800, on a main circuit board of the information handling system, integrated onto another component such as I/O interface 810, in another suitable location, or a combination thereof. Network interface device 880 includes network channels 882 and 884 that provide interfaces to devices that are external to information handling system 800. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Management device 890 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 800. In particular, management device 890 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 800, such as system cooling fans and power supplies. Management device 890 can include a network connection to an external management system, and the management device can communicate with the management system to report status information for information handling system 800, to receive BIOS/UEFI or system firmware updates, or to perform other task for managing and controlling the operation of information handling system 800.

Management device 890 can operate off of a separate power plane from the components of the host environment so that the management device receives power to manage information handling system 800 when the information handling system is otherwise shut down. An example of management device 890 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 890 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. An information handling system comprising:
a storage to store a current firmware release for the information handling system; and
a baseboard management controller to communicate with the storage, the baseboard management controller to:

generate a set of breakpoints for code differences from a previous firmware release to the current firmware release;

execute a plurality of testcases for the current firmware release;

based on the execution of the testcases, store breakpoint hitting events for the testcases in the storage;

filter and rank the breakpoint hitting events;

map the filtered and ranked breakpoint hitting events to the code differences; and store, in the storage, a reduced list of the code differences that are highly related to failed testcases of the current firmware release.

2. The information handling system of claim 1, wherein the breakpoint hitting events being filtered and ranked includes the baseboard management controller further to: remove breakpoint hit events associated with background operations.

3. The information handling system of claim 1, wherein the breakpoint hitting events being filtered and ranked includes the baseboard management controller further to:
extract an ending timestamp for a failed testcase;
determine breakpoint hit events that occur before the ending timestamp; and
filter out breakpoint hit events that do not occur before the ending timestamp.

4. The information handling system of claim 3, wherein the breakpoint hitting events being filtered and ranked includes the baseboard management controller further to: rank the breakpoint hit events that occur before the ending timestamp.

5. The information handling system of claim 4, wherein the baseboard management controller utilizes term frequency-inverse document frequency to rank the breakpoint hit events that occur before the ending timestamp.

6. The information handling system of claim 4, wherein the breakpoint hitting events being filtered and ranked includes the baseboard management controller further to: filter out breakpoint hit events with a rank score below a threshold score.

7. The information handling system of claim 1, wherein the set of breakpoints for code differences are located in multiple threads of the current firmware release.

8. The information handling system of claim 1, wherein the baseboard management controller further to: associated different breakpoint hit events to different steps of the testcase.

9. A method comprising:
storing, in a storage of an information handling system, a current firmware release for the information handling system;
generating, by a baseboard management controller of the information handling system, a set of breakpoints for code differences from a previous firmware release to the current firmware release;
executing a plurality of testcases for the current firmware release;
based on the execution of the testcases, storing breakpoint hitting events for the testcases stored in the storage;
filtering and ranking the breakpoint hitting events;
mapping, by the baseboard management controller, the filtered and ranked breakpoint hitting events to the code differences; and
storing, in the storage, a reduced list of the code differences that are highly related to failed testcases of the current firmware release.

10. The method of claim 9, wherein the filtering and ranking of the breakpoint hitting events includes the method further comprising: removing breakpoint hit events associated with background operations.

11. The method of claim 9, wherein the filtering and ranking of the breakpoint hitting events includes the method further comprising:
extracting an ending timestamp for a failed testcase;
determining breakpoint hit events that occur before the ending timestamp; and
filtering out breakpoint hit events that do not occur before the ending timestamp.

12. The method of claim 11, wherein the filtering and ranking of the breakpoint hitting events includes the method further comprising: ranking the breakpoint hit events that occur before the ending timestamp.

13. The method of claim 12, further comprising utilizing term frequency-inverse document frequency to rank the breakpoint hit events that occur before the ending timestamp.

14. The method of claim 12, wherein the filtering and ranking of the breakpoint hitting events includes the method further comprising filtering out breakpoint hit events with a rank score below a threshold score.

15. The method of claim 9, wherein the set of breakpoints for code differences are located in multiple threads of the current firmware release.

16. The method of claim 9, wherein the method further comprises: associating different breakpoint hit events to different steps of the testcase.

17. An information handling system comprising:
a storage to store a current firmware release for the information handling system; and
a baseboard management controller to:
generate a set of breakpoints for code differences from a previous firmware release to the current firmware release;
execute a plurality of testcases for the current firmware release;
based on the execution of the testcases, store breakpoint hitting events for the testcases in the storage;
remove a first set of the breakpoint hit events associated with background operations;
extract an ending timestamp for a failed testcase;
determine a second set of the breakpoint hit events that occur before the ending timestamp;
filter out a third set of the breakpoint hit events that do not occur before the ending timestamp;
map the filtered out third set of the breakpoint hit events to the code differences; and
store, in the storage, a reduced list of the code differences that are highly related to the failed testcase of the current firmware release.

18. The information handling system of claim 17, wherein the baseboard management controller ranks a fourth set of the breakpoint hit events that occur before the ending timestamp.

19. The information handling system of claim 18, wherein the baseboard management controller utilizes term frequency-inverse document frequency to rank the second set of the breakpoint hit events that occur before the ending timestamp.

20. The information handling system of claim 18, wherein the baseboard management controller further to: filter out the fourth set of the breakpoint hit events with a rank score below a threshold score.

* * * * *